United States Patent Office 2,759,015
Patented Aug. 14, 1956

2,759,015

ACETO-ACETIC ESTERS OF PHENOXY-POLYETHOXY ALCOHOL

John D. Zech, Wilmington, Del., assignor to Atlas Powder Company, Wilmington, Del., a corporation of Delaware No Drawing. Application December 30, 1952,
Serial No. 328,830

1 Claim. (Cl. 260—483)

The present invention relates to aceto-acetic esters of polyoxyalkylene aryl ethers.

It is the object of the present invention to provide a series of new chemical compounds. Further objects and advantages will become apparent to those skilled in the art from the following discussion and disclosure.

The compounds included within the scope of this invention may be expressed by the generic formula

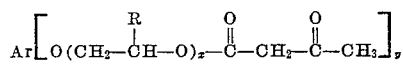

wherein Ar is an aromatic radical, $x$ is from 2 to 6, $y$ is from 1 to 3, and R is selected from the group consisting of H, $CH_3$ and $CH_2Cl$.

It has been found that these compounds may be prepared by a process of transesterification. For this purpose methyl aceto-acetate and ethyl aceto-acetate have been found most satisfactory, although other aceto-acetates may be suitable for the purposes of this invention. The compounds are useful as plasticizers for resins.

In preparing the polyoxyalkylene aryl ethers any of a large number of aromatic hydroxy compounds have been found suitable. Among the aromatic hydroxy compounds satisfactory for this purpose are: phenol, o-cresol, m-cresol, p-cresol, 2,4-xylenol, 3,5-xylenol, o-ethyl phenol, p-propyl phenol, p-tertiary butyl phenol, p-methoxy phenol, 2,2-bis p-hydroxy phenyl propylidene, hydroquinone, o-chlorophenol, p-chlorophenol, p-nitrophenol, 2,4-dichlorophenol, 2,4,6-trichlorophenol, o-phenyl phenol, p-cyclohexyl phenol, p-nonyl phenol, diamyl phenol, α-naphthol, β-naphthol, o-carbobutoxyphenol, resorcinol, etc. Also to be included are mixtures of certain of the foregoing hydroxy aromatic compounds as is found in commercial grades of cresylic acid, xylenols, etc. It is to be understood that the aromatic radical of the aryl ethers may be substituted by any of a large number of organic or inorganic radicals, provided they are non-reactive toward aceto-acetic esters or hydroxyl groups. Other aromatic radicals may be linked to the aromatic ring either directly or indirectly. The hydroxy aryl ether aromatic ring may be derived also from naphthalene anthracene, phenanthrene or similar ring structures. Both saturated and unsaturated, unsubstituted and substituted alkyl radicals may be linked to the aromatic ring of the hydroxy aryl ether and the ring may be either mono alkylated or poly alkylated. Further, the hydroxy aryl ethers may be either mono ethers or poly ethers.

The hydroxy polyoxyalkylene ethers of hydroxy derivatives of aromatic compounds are known materials and may be prepared by any desired method. Hydroxy aromatic compounds may be reacted with such epoxides as ethylene oxide and propylene oxide. They can also be prepared by reacting an aromatic hydroxy compound with a preformed polyglycol or the halohydrin of the polyglycol, such as epichlorhydrin. The length of the polyoxyalkylene ether chain of the individual compounds may obviously vary over a wide range. In preparing aceto acetates for use as plasticizers, it has been found that in using the polyoxyethylene ethers of the hydroxy aromatic compounds, the proportion of oxyethylene groups to hydroxyl groups may range from 2/1 to 6/1 with the best results obtained when the ratio is maintained from 3/1 to 5/1. In using the polyoxypropylene ethers the proportion of oxypropylene groups to hydroxyl groups may vary from 1/1 to 5/1 with the best results when the ratio of oxypropylene groups to hydroxyl groups is maintained from 2/1 to 4/1. The polyoxypropylene compounds will have less water solubility, lower volatility and higher molecular weight than the corresponding polyoxyethylene compounds of the same number of oxyalkylene groups. Where the hydroxy aromatic radicals are of low molecular weight the volatility of the desired compound can be reduced by increasing the length of the polyoxyalkylene ether chain. In general, the length of the polyoxyalkylene ether chain will be dictated by such factors as (1) volatility, (2) compatibility with the resin to be plasticized and (3) degree of water sensitivity required in the plasticized resin composition.

In preparing the compounds of the present invention it has been found that the reaction temperature for the reaction between the polyoxyalkylene ether of the aryl hydroxide, and the lower alkyl aceto acetate may range from 75 to 175° C.

The following examples are given as best illustrating the invention and are not to be taken as limiting the invention in any way.

*Examples*

1. 1 mole (270 g.) of hydroxy polyethoxy ether of phenol, prepared by reacting 4 moles of ethylene oxide with one mole of phenol and 5 moles (650 g.) of ethyl aceto-acetate were charged to a two-liter, 3-neck flask, fitted with a stirrer, a thermometer and a still head to remove ethanol as it is liberated. The mixture was heated with stirring at 125° C. to 152° C. for 10 hours, during which 46 cc. of distillate was collected. The reaction mixture was then vacuum stripped at 160° C. at 2 mm. to remove the ethanol and excess ethyl aceto-acetate, leaving 345 g. of polyoxyethylene phenol aceto-acetate, containing an average of 4 oxyethylene groups per mole, being a high boiling colorless liquid.

The following examples are given to exemplify more fully the scope of this invention and the method of transesterification as set forth in Example 1 is the same in the following examples.

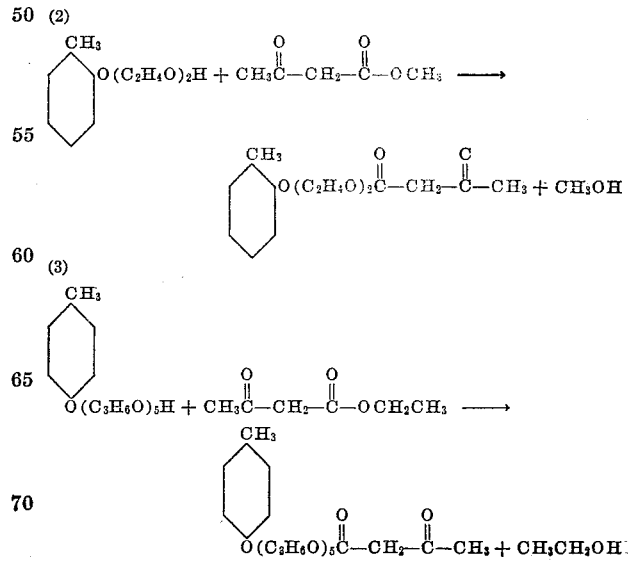

(4) 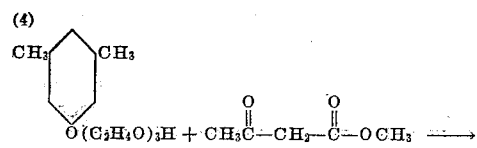

(5) 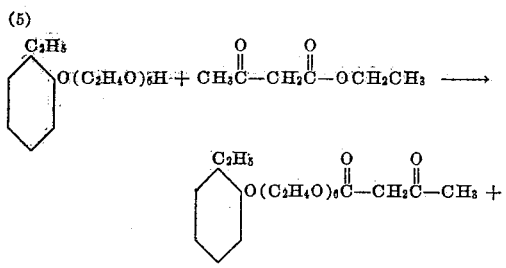

(6) 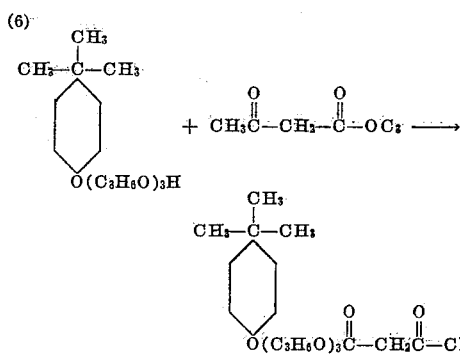

(7) 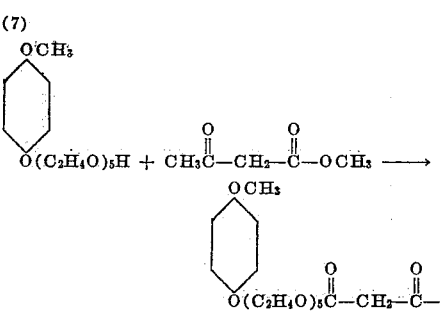

(8) 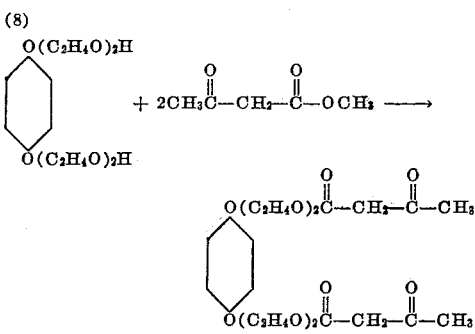

(9) 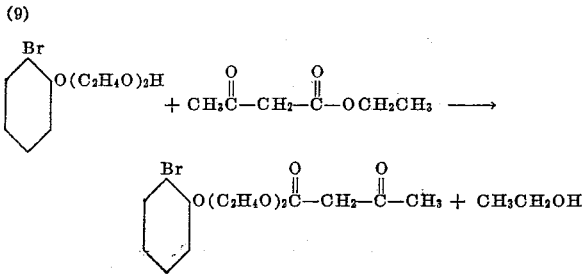

(10) 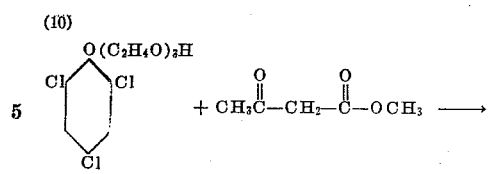

(11) 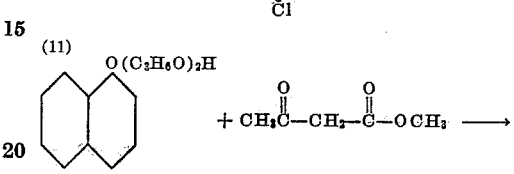

(12) 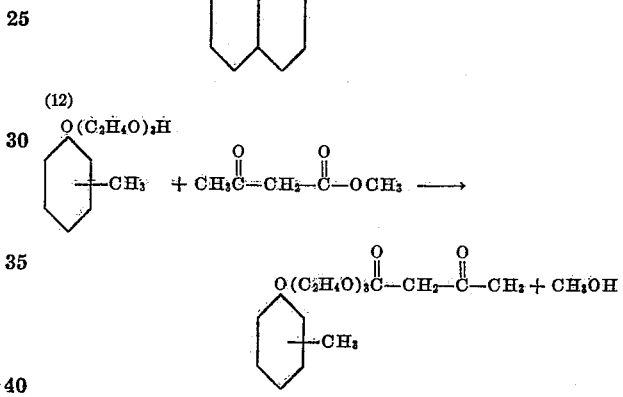

(13) 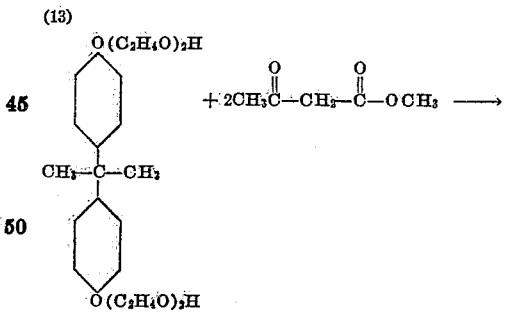

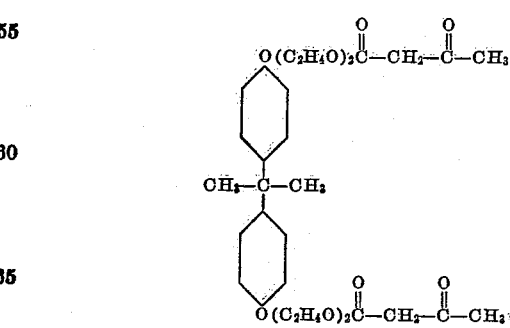

This type of compound is well suited for use either as a primary or secondary plasticizer. The aceto-acetic ester of tetraethoxy mono phenyl ether was found to be a good plasticizer for cellulose acetate. The compounds covered by this invention may also be used as plasticizers for such resins as vinyl chloride, vinyl acetate, vinyl chloride-vinylacetate copolymer cellulose acetate-butyrate, nitrocellulose, etc.

It is to be understood that this invention is not limited by the foregoing examples as those skilled in the art will readily perceive the compounds included within the scope of this invention may be varied widely to suit the needs of the user.

I claim:

The aceto-acetic acid ester of the polyoxyethylene ether of phenol containing an average of 4 oxyethylene groups per mol.

References Cited in the file of this patent

UNITED STATES PATENTS

| | | |
|---|---|---|
| 2,004,115 | Izard et al. | June 11, 1935 |
| 2,103,505 | Wiezevich et al. | Dec. 28, 1937 |
| 2,167,168 | Boese et al. | July 25, 1939 |
| 2,213,477 | Steindorff et al. | Sept. 3, 1940 |

OTHER REFERENCES

Bader et al.: J. Am. Chem. Soc. 73 (1951), 4195–7.